(12) United States Patent
Ruppert et al.

(10) Patent No.: US 11,477,977 B2
(45) Date of Patent: Oct. 25, 2022

(54) FOLDABLE REAR BOOM SECTION

(71) Applicant: CNH Industrial America LLC, New Holland, PA (US)

(72) Inventors: Rex Leroy Ruppert, Benson, MN (US); Jeffrey Scot Martin, Benson, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 128 days.

(21) Appl. No.: 16/736,315

(22) Filed: Jan. 7, 2020

(65) Prior Publication Data
US 2021/0204537 A1 Jul. 8, 2021

(51) Int. Cl.
*A01M 7/00* (2006.01)

(52) U.S. Cl.
CPC .......... *A01M 7/0075* (2013.01); *A01M 7/006* (2013.01); *A01M 7/0057* (2013.01)

(58) Field of Classification Search
CPC . A01M 7/0057; A01M 7/0075; A01B 73/048; A01C 73/04; A01C 73/02; A01C 73/044; A01C 73/048; F16L 37/082; B25J 7/106; Y10T 16/54052
See application file for complete search history.

(56) References Cited

U.S. PATENT DOCUMENTS

| | | | | | |
|---|---|---|---|---|---|
| 1,887,092 | A | * | 11/1932 | Glase | A01M 7/005 239/168 |
| 2,211,759 | A | * | 8/1940 | Pitner | F16L 55/10 285/236 |
| 2,965,304 | A | * | 12/1960 | Krause | E01H 3/02 239/587.2 |
| 4,767,062 | A | * | 8/1988 | Fletcher | A01C 15/04 239/151 |
| 4,878,545 | A | * | 11/1989 | Dyken | A01B 73/04 172/776 |
| 5,098,018 | A | * | 3/1992 | Hadar | A01M 7/0014 180/89.13 |
| 5,178,328 | A | * | 1/1993 | Broyhill | A01M 7/0075 172/311 |

(Continued)

FOREIGN PATENT DOCUMENTS

| | | |
|---|---|---|
| CN | 2691262 Y | 4/2005 |
| WO | 2019105651 A1 | 6/2019 |

OTHER PUBLICATIONS

Case IH—Patriot Series Sprayers—https://www.caseih.com/northamerica/en-us/products/application-equipment/patriot-series-sprayers ; accessed Jul. 25, 2019.

(Continued)

*Primary Examiner* — Tuongminh N Pham
(74) *Attorney, Agent, or Firm* — Rebecca L. Henkel; Rickard K. DeMille

(57) ABSTRACT

A foldable rear boom section of an agricultural product applicator includes at least one first tube connected to a first end of a respective at least one second tube and a hinge assembly coupled to the first and second tubes and configured to pivot the second tube with respect to the first tube about a pivot axis. Further, a nozzle is connected to a second end of the second tube. Pivoting the first and second tubes about the pivot axis causes the foldable rear boom section and the nozzle to transition between an extended position and a retracted position.

16 Claims, 7 Drawing Sheets

(56) References Cited

U.S. PATENT DOCUMENTS

| | | | |
|---|---|---|---|
| 5,348,226 | A | 9/1994 | Heiniger et al. |
| 5,630,547 | A | 5/1997 | Klemenhagen et al. |
| 5,927,606 | A | 7/1999 | Patterson |
| 6,295,983 | B1 * | 10/2001 | Semeia ................ B63C 11/205 128/200.29 |
| 6,786,233 | B1 * | 9/2004 | Anderson ............... B66C 23/64 137/615 |
| 6,966,501 | B2 | 11/2005 | Wubben et al. |
| 8,820,429 | B2 | 9/2014 | Knobloch et al. |
| 8,869,909 | B2 | 10/2014 | Blunier et al. |
| 10,188,023 | B2 | 1/2019 | Schlimgen et al. |
| 10,212,927 | B2 | 2/2019 | Bouten |
| 2017/0027103 | A1 | 2/2017 | Grotelueschen |
| 2017/0027152 | A1 | 2/2017 | Hiddema et al. |

OTHER PUBLICATIONS

Blaney—Sprayers—https://www.blaneyagri.com/machinery/sprayers/ ; accessed Jul. 25, 2019.

ProTank—Broadcast Hooded Sprayers—https://www.protankequipment.com/broadcast-hooded-sprayer-applicators/ ; accessed Jul. 25, 2019.

* cited by examiner

FOLDABLE REAR BOOM SECTION

FIELD OF THE INVENTION

The invention relates generally to an agriculture product applicator having a foldable rear boom or center section and, more particularly, a rear boom that is foldable at its ends in order to reduce the overall width of the agriculture product applicator.

BACKGROUND OF THE INVENTION

Dry agriculture product applications are getting larger with wider booms to gain efficiency by allowing increased coverage in a single pass of an agricultural field. Even though the applicators and their booms are getting larger, they still need to be road-transportable. Foldable main booms for applicators are known with left and right boom arms that can be folded-in and against the left and right sides of the applicators to provide transport modes suitable for road transport.

Rear booms or center sections apply product behind and along the width of the applicator to fill the space between the left and right boom arms that would not otherwise receive product. To achieve consistent spacing between nozzles, some wider booms may have substantial distances between the inner most nozzles of their left and right boom arms that must be covered by the rear booms or center sections. As a result, the rear booms and center sections can be so wide that they compromise the road-transportability of the applicator.

As a result, there is a need in the art for a rear boom or center section that is foldable to reduce the overall width of the rear boom or center section in order to make the applicator road-transportable.

SUMMARY OF THE INVENTION

According to an aspect of the invention, a foldable rear boom section of an agricultural product applicator includes at least one first tube connected to a first end of a respective at least one second tube and a hinge assembly coupled to the first and second tubes and configured to pivot the second tube with respect to the first tube about a pivot axis. Further, a nozzle is connected to a second end of the second tube. Pivoting the first and second tubes about the pivot axis causes the foldable rear boom section and the nozzle to transition between an extended position and a retracted conveyance position.

In accordance with another aspect of the invention, the hinge assembly includes a hinge base coupled to the first tube and a pivot arm coupled to the second tube. The hinge base includes one or more hinge base plates linearly extending parallel to the second tube from a first end adjacent the second tube to a second end spaced apart from the second tube. Similarly, the pivot arm includes one or more pivot arm plates coupled to the second tube at a first end of the pivot arm plates. Each pivot arm plate extends upward from its first end to a pivot point and then upward from the pivot point to a second end. In addition, the first end of the hinge base plates and the pivot point of the pivot arm plates are pivotably coupled together and configured to allow the first and second tubes to pivot with respect to each other.

In accordance with yet another aspect of the invention, the hinge assembly further includes an actuator configured to cause pivoting of the pivot arm with respect to the hinge base in order to cause pivoting of the second tube with respect to the first tube. The second end of the pivot arm plates are connected via a first pivot axle. Similarly, the second end of the hinge base plates are connected via a second pivot axle. In turn, a first end of the actuator is coupled to the first pivot axle and the second end of the actuator is coupled to the second pivot axle.

According to another aspect of the invention, a rear boom section of an agricultural product applicator includes a plurality of supply lines, a plurality of first tubes, a plurality of second tubes, and a plurality of nozzles. Each first and second tube has a first end and second end. The first end of each first tube is coupled to one of the supply lines. The first end of each second tube is coupled to the second end of one of the first tubes. In addition, each nozzle is configured to distribute product received from one of the supply lines by way of one of the first tubes and one of the second tubes. Further, at least one hinge assembly is coupled to a respective first tube and second tube in order to transition the nozzle between an extended position to a retracted position.

In accordance with another aspect of the invention, the second end of at least one of the first tubes is tapered to fit within the first end of its respective second tube. In addition, the first end of at least one of the second tubes is conically flared to receive the second end of its respective first tube.

In accordance with yet another aspect of the invention, each hinge assembly includes a hinge base coupled to its respective first tube and a pivot arm coupled to its respective second tube. The hinge base includes one or more hinge base plates extending parallel to the second tube and from a first end adjacent the second tube to a second end spaced apart from the second tube. Similarly, the pivot arm includes one or more pivot arm plates coupled to the second tube at a first end of the pivot arm plates. Each pivot arm plate extends upward from its first end to a pivot point and then upward from the pivot point to a second end. The first end of each hinge base plate and the pivot point of each pivot arm plate are pivotably coupled together at a pivot axis configured to allow the second tube to pivot with respect to the first tube about the pivot axis.

In accordance with another aspect of the invention, the hinge assembly includes an actuator having a first end aligned with the second end of each pivot arm plate and a second end aligned with the second end of each hinge base plate. The actuator is configured to cause pivoting of the second tube with respect to the first tube about the pivot axis.

In accordance with yet another aspect of the invention, each pivot arm plate extends upward from its first end to the pivot point at an angle toward its respective first tube. In turn, each pivot arm plate extends upward from the pivot point to its second end at an angle away from its respective first tube.

According to yet another aspect of the invention, an agricultural product applicator includes a conveying system including a supply line for supplying product and a centrally mounted rear boom section having a plurality of secondary supply lines coupled to the supply line of the conveying system, a first outer distribution system, a first hinge assembly to transition the first outer distribution nozzle system an extended position and a retracted position, a second outer distribution system, a second hinge assembly to transition the second outer distribution system between an extended position and a retracted position, and at least one inner distribution system. The first outer distribution system includes a first tube with a first end coupled to one of the secondary supply lines and a second tube with a first end coupled to a second end of the first tube. Likewise, the second outer distribution system includes a first tube with a first end coupled to one of the secondary supply lines and a second tube having a first end coupled to a second end of the first tube.

In accordance with another aspect of the invention, the first hinge assembly includes a hinge base coupled to the first tube of the first outer distribution system and a pivot arm coupled to the second tube of the first outer distribution system. Similarly, the second hinge assembly includes a hinge base coupled to the first tube of the second outer distribution system and a pivot arm coupled to the second tube of the second outer distribution system.

In accordance with yet another aspect of the invention, the hinge base of each hinge assembly extends parallel to its respective second tube from a first end adjacent its respective second tube to a second end spaced apart from its respective second tube. Meanwhile, the pivot arm of each hinge assembly is coupled to its respective second tube at a first end of the pivot arm, the pivot arm extending upward from its first end to a pivot point and then upward from the pivot point to a second end. The first end of the hinge base plates and the pivot point of the pivot arm plates are coupled together at a pivot axis configured to allow the second tube to pivot with respect to the first tube about the pivot axis.

In accordance with another aspect of the invention, each hinge assembly also includes an actuator with a first end aligned with the second end of the pivot arm and a second end aligned with the second end of the hinge base. The actuator is configured to cause pivoting of the second tube with respect to the first tube about the pivot axis.

These and other aspects and features of the present invention will be more fully understood from the following detailed description and the enclosed drawings.

Figure 1:
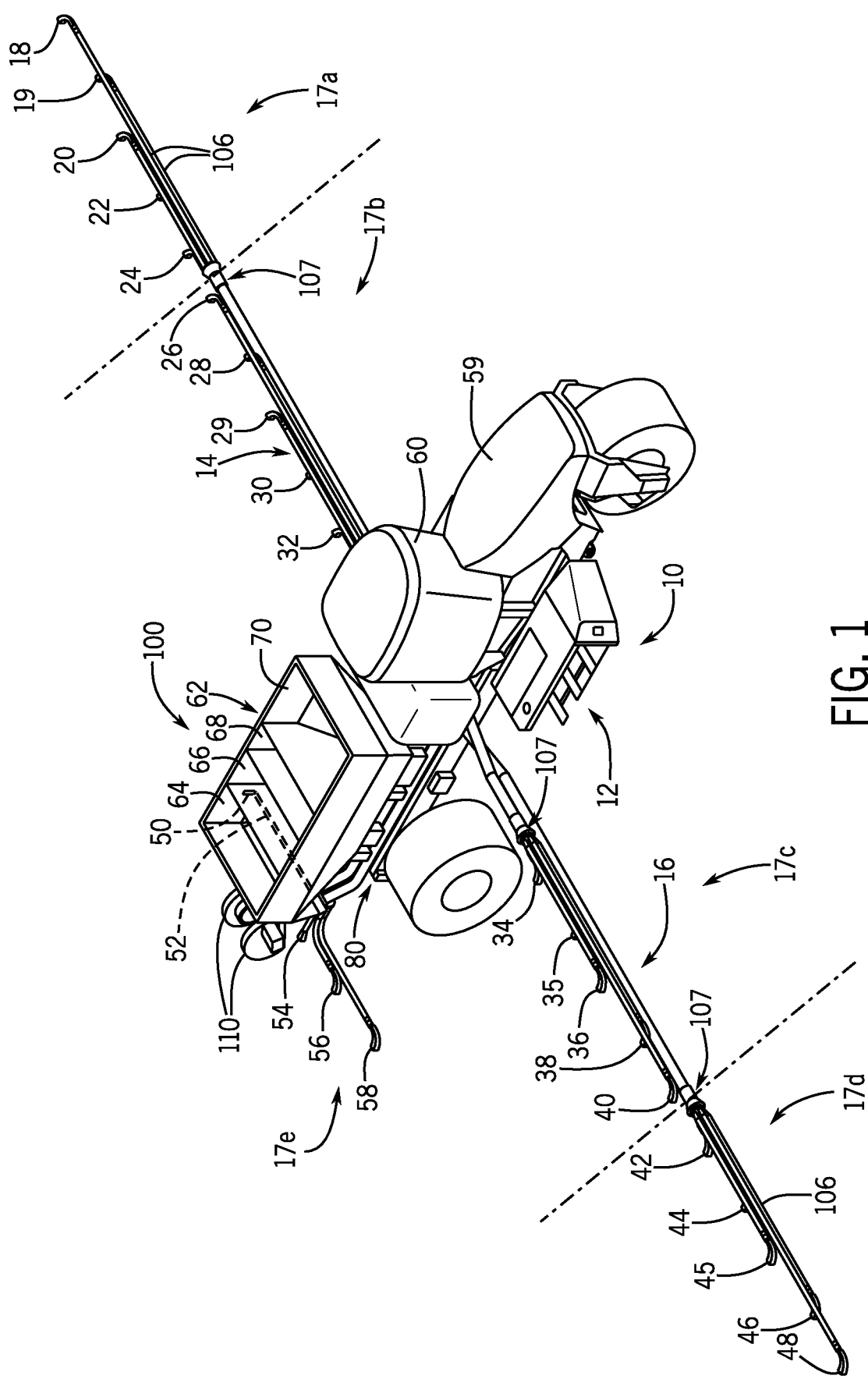
FIG. 1 illustrates a perspective view of an exemplary embodiment of an agricultural product applicator.

Before describing any preferred, exemplary, and/or alternative embodiments of the invention in detail, it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION OF THE INVENTION

Figure 2:
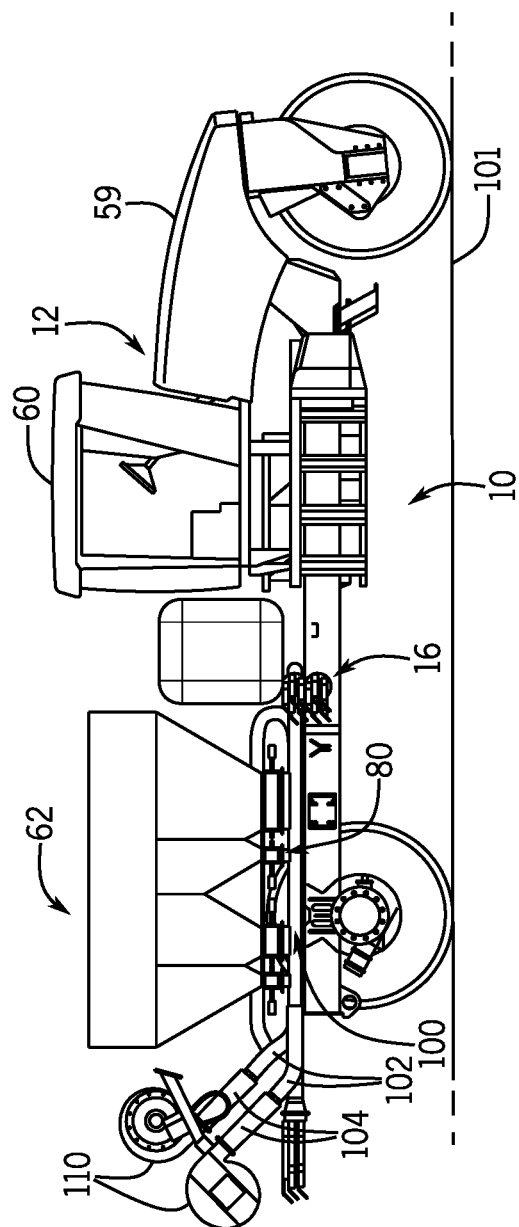
FIG. 2 illustrates a side elevation view of the agricultural product applicator of FIG. 1.

Referring now to the drawings and specifically to FIGS. 1 and 2, aspects of the invention are shown for use with an agricultural product applicator 10, for example, but not limited to, a fertilizer or dry nutrient product applicator 10. As is known in the art, applicator 10 generally includes a large wheeled transport unit 12, such as a truck or tractor, and laterally extending product delivery booms 14, 16. The booms 14, 16 may be pivoted to a stowed position close to the applicator 10 for storage or transport. Each boom 14, 16 extends laterally from the applicator 10 in opposite directions. Each boom 14, 16 includes a plurality of boom sections 17, such as a left outer boom section 17a, a left inner boom section 17b, a right inner boom section 17c, and a right outer boom section 17d. Each boom section 17 is defined by a large diameter supply line 102 for supplying the boom section 17 with product such as seed, fertilizer, herbicide, insecticide and the like. Each boom section 17 includes a plurality of boom tubes or conduit terminating at delivery units, which for the applicator 10 are spreading outlets or nozzles. In the exemplary embodiment shown, left outer boom sections 17a of boom 14 includes fixed nozzles 18, 19, 20, 22, 24; left inner boom section 17b of boom 14 includes five nozzles 26, 28, 29, 30, 32; right inner boom section 17c of boom 16 includes five nozzles 34, 35, 36, 38, 40; and right outer boom section 17d of boom 16 includes five nozzles 42, 44, 45, 46, 48.

Additionally, at the back of the applicator 10 there is a centrally mounted rear/center boom section 17e also defined by a large diameter supply line 102 for supplying the boom section 17e with product. The rear boom section 17e includes six rear nozzles 50, 51, 52, 54, 56, 58 to provide full and complete coverage across the width of the applicator 10, including the area between the inboard-most nozzles 32, 34 of booms 14, 16. The rear boom section 17e allows the applicator 10 to spread the product over/onto the ground over which the applicator 10 passes for complete coverage. Although five boom sections 17, with five or six nozzles per boom section 17, is shown by way of example, in other aspects of the invention greater or fewer boom sections 17 with greater or fewer nozzles per boom section 17 can be provided within the scope of the invention.

The transport unit 12 can be self-propelled by an engine in an engine compartment 59 and can include an operator cab 60 having Human Machine Interface (HMI) available to the user. In the representative embodiment of the invention, an uncovered tank 62 includes compartments 66, 70 for carrying product to be distributed in a metering section 80 for ultimate disbursement by nozzles 18-58. The uncovered tank 62 may also include additional smaller compartments 64, 68 to supply micro-nutrients or other materials in the metering section 80. The supply of product in compartments 64, 66, 68, 70 can be replenished periodically from a supply vehicle (not shown).

Figure 3:
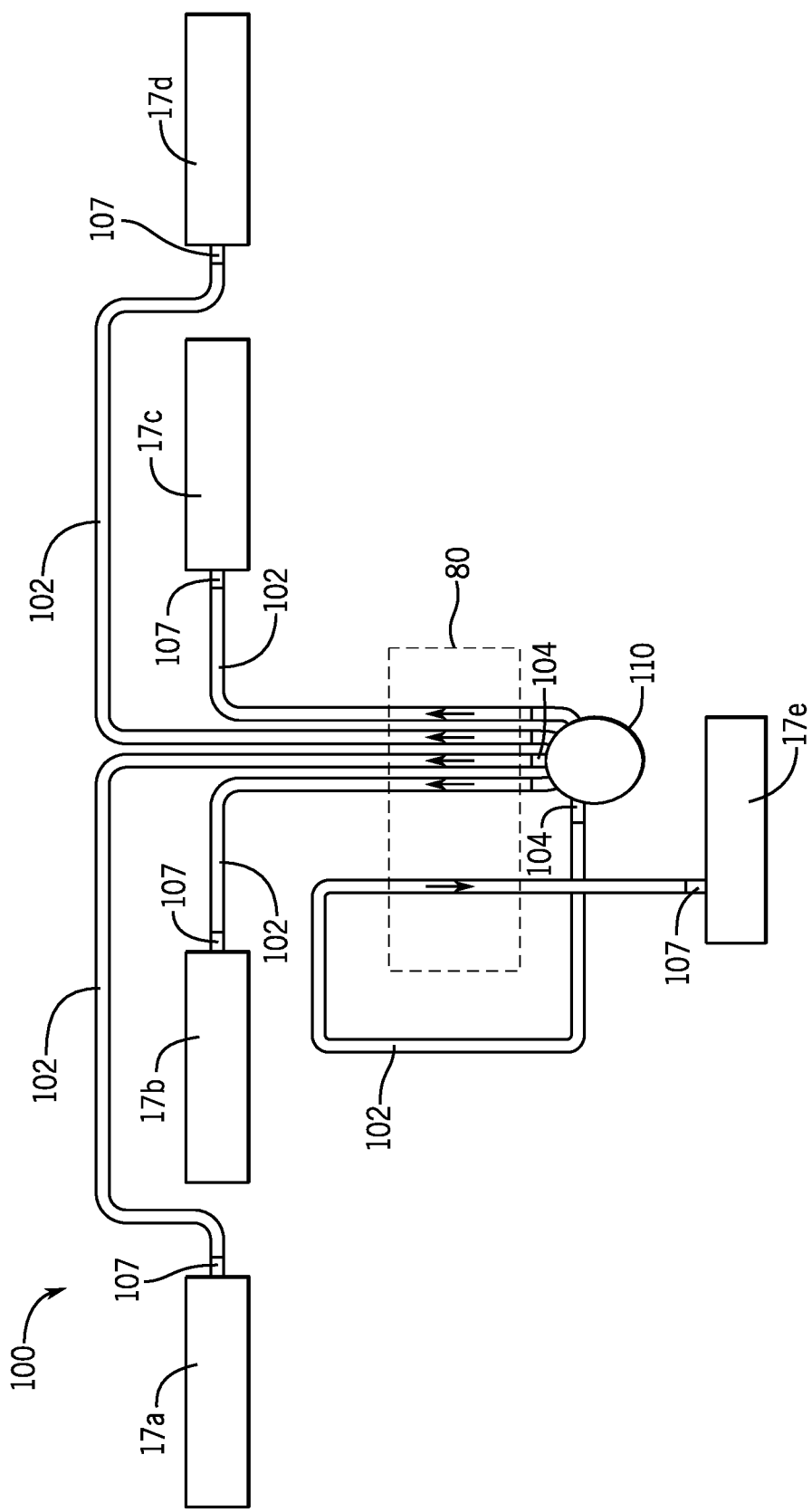
FIG. 3 illustrates a pneumatic conveying system of the agricultural product applicator of FIG. 1.

As shown in FIGS. 1-3 by way of example, the compartments 64-70 of the tank 62 and the metering section 80 are disposed directly above a conveying system 100, which could be a pneumatic conveying system or assembly. The conveying system 100 includes multiple large diameter supply lines 102, which could be 5 inches in diameter, that extend from a plenum 104 at one end, under the compartments 64-70 and terminate at individual boom sections 17. At each boom section 17, the supply lines 102 and the product transported therein are split by a suitable distribution structure or mechanism 107, such as a plurality of horizontal rotary distributors, among or into a number of secondary or smaller supply lines 106, which could be 2.5 inches in diameter, that are connected to individual nozzles 18-58.

To collect and drive the product along the lines 102, one or more fans 110 can be operably connected to the plenum 104 opposite the inlet ends of lines 102 as described herein. The air flow from the fans 110 is directed through the plenum 104 and into the respective lines 102 as a result of the structure of the plenum 104. After the air flow passes through the plenum 104 and collects/entrains the particulate material from the compartments 64-70 via the metering section 80, the air flow continues to flow along each large diameter supply line 102, including with one or more 90° and/or 180° turns, to connect to the various boom sections 17. The fans 110 could be centrifugal fans that are 8 inches or less in diameter, and in some aspects, 6 inches or less.

Figure 4:
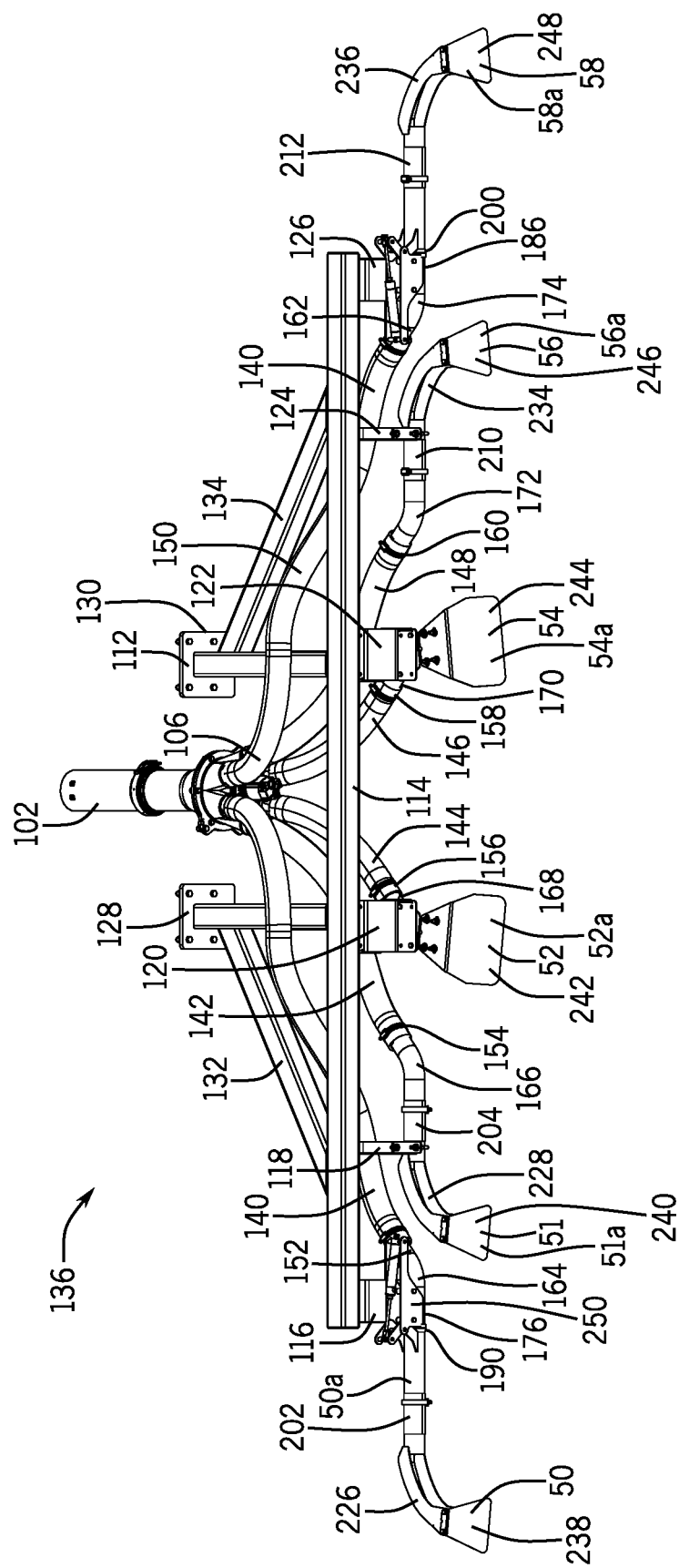
FIG. 4 illustrates a rear elevation view of a rear boom of the agricultural product applicator of FIG. 1 in an extended position.
Figure 5:
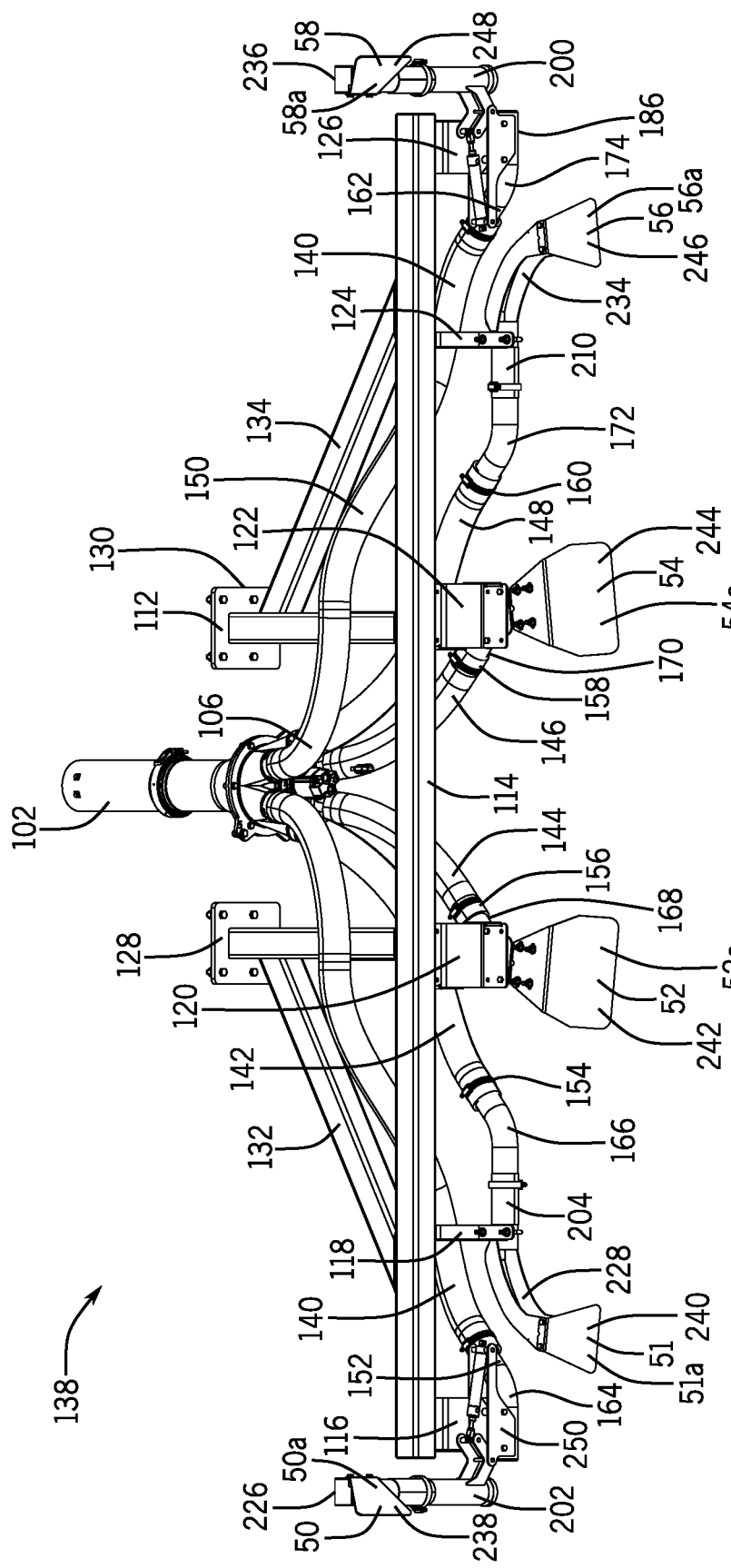
FIG. 5 illustrates a rear view of the rear boom of the agricultural product applicator of FIG. 1 in a conveyance position.

Referring now to FIGS. 4 and 5, a rear view of the applicator 10 further illustrates the rear boom section 17e and its nozzles 50-58. As stated above, while the rear boom section 17e is shown as includes six nozzles 50-58, other embodiments of the invention may include any number of nozzles. In the representative embodiment of the invention, the rear boom section 17e includes a support frame 112 coupled to the applicator 10 and cantilevered from the rear of the applicator 10. The support frame 112 includes a support bar 114 extending laterally in order to support each of the nozzles 50-58. That is, each nozzle 50-58 is attached to the support frame 112 via a respective mounting bracket 116-126. Further, the support frame 112 includes support members 128, 130 extending from the support bar 114 to the chassis of the applicator 10. The support frame 112 may also include cross-braces 132, 134 extending between the support bar 114 and the support members 128, 130, respectively, to add strength to the support frame 112. In other embodiments of the invention, the support frame 112 may include more or less than the two support members 128, 130 and two cross-braces 132, 134 shown in FIGS. 4 and 5. As will be described in further detail below, the outer nozzles 50, 58 of the rear boom 17e are transitionable between an extended position 136 (FIG. 4) and a retracted position 138 (FIG. 5). In the retracted position 138, the outer nozzles 50, 58 are folded upward to reduce the overall width of the rear boom 17e. The applicator 10 has a reduced overall width when the rear boom 17e is in the retracted position 138 and the other booms 17 are in their retracted positions. In turn, the reduced width of the applicator 10 allows for the applicator 10 to be road-transportable.

The nozzles 50-58 of the rear boom 17e are fed by the above described supply lines 106. In the representative embodiment of the invention, the supply lines 106 are in the form of a number of flexible tubes 140-150. Each flexible tube 140-150 connects to a respective inner end 152-162 of a respective first tube 164-174 for each nozzle 50-58. In the representative embodiment of the invention, each first tube 164-174 is a rigid elbow tube bent in a gradual s-shape and arranged horizontally so as to be parallel with the ground 101.

An outer end 176, 186 of each elbow tube 164-174 is connected to an inner end 190, 200 of a respective second tube 202-212. In the representative embodiment of the invention, each second tube 202-212 is a rigid straight tube. The outer end 176, 186 of each elbow tube 164-174 tapers in order to be insertable into the inner end 190, 200 of its respective second tube 202-212. As shown in FIGS. 4 and 5, and in greater detail in FIGS. 6 and 7, the inner ends 190, 200 of the second tubes 202, 212 are conically flared so as to receive the outer ends 176, 186 of the respective elbow tubes 164, 174. In varying embodiments of the invention, any number of the second tubes 202-212 may include a conically flared inner end 190, 200. An outer end 214-224 of each straight tube 202, 212 is connected to a respective chute 226-236. In turn, each chute 226-236 includes an end deflector 238-248, which define the nozzles 50-58, respectively.

That is, the nozzles 50-58 of the rear boom section 17e are each a part of their own distribution system 50a-58a. For instance, the left outer distribution system 50a includes a nozzle 50 connected to a chute 226, which is connected to a second tube 202, which is connected to a first tube 164, which in turn is connected to one of the supply lines 106, as described above. Meanwhile, the right outer distribution system 58a includes a nozzle 58 connected to a chute 236, which is connected to a second tube 212, which is connected to a first tube 174, which is connected to one of the supply lines 106, as described above. Similarly, inner distribution systems 51a-56a include respective nozzles 51-56 connected to respective chutes 228-234, which are connected to respective second tubes 204-210, which are connected to respective first tubes 166-172, which are connected to respective supply lines 106, as described above.

Figure 6:
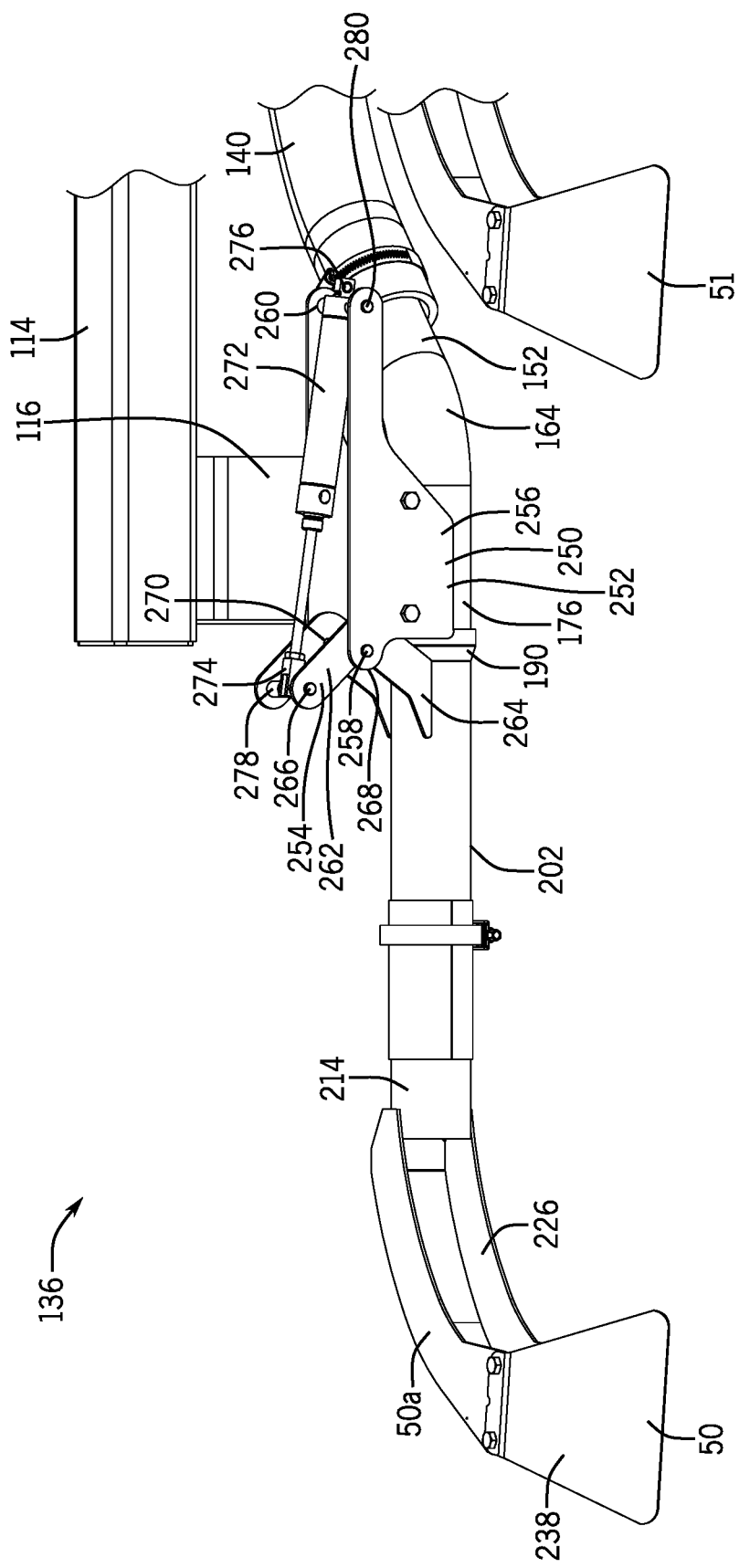
FIG. 6 illustrates an enlarged rear view of the left side of the rear boom of FIG. 4.

Referring to FIG. 6, nozzle 50 and its respective straight tube 202 and elbow tube 164 are shown in greater detail. A hinge assembly 250 is coupled to and supports both the straight tube 202 and the elbow tube 164. In the representative embodiment of the invention, the hinge assembly 250 includes a hinge base 252 coupled to the first, elbow tube 164 and a pivot arm 254 coupled to the second, straight tube 202. The hinge base 252 includes one or more plates 256 coupled to the first tube 164. The plates 256 extend from a first end 258 adjacent the second tube 202 to a second end 260 spaced away from the second tube 202. As shown in FIG. 6, the hinge base plates 256 extend linearly away from the first end 190 of the second tube 202 in a direction parallel to the second tube 202.

The pivot arm 254 includes one or more plates 262 coupled to the second tube 202 at a first end 264 of the pivot arm plates 262. Each plate 262 then extends upward to a second end 266. As shown in FIG. 6, the plate 262 may be L-shaped. That is, each plate 262 may extend upward from the first end 264 at the second tube 202 and at an angle toward the first tube 164 to a pivot point 268. At the pivot point 268, the plate 262 then extends upward from the pivot point 268 and at an angle away from the first tube 164 to the second end 266.

The first end 258 of the hinge base plates 256 is coupled to the pivot point 268 of the pivot arm plates 262 to create a pivot axis 270. As a result, the hinge base 252 and the pivot arm 254 of the hinge assembly 250 are configured to pivot with respect to each other about the pivot axis 270. In turn, the first tube 164 and the second tube 202 are able to pivot with respect to each other about the pivot axis 270.

Further yet, an actuator 272, such as a linear pneumatic cylinder, extends from a first end 274 at the second end 266 of the pivot arm 254 to a second end 276 at the second end 260 of the hinge base 252. In the representative embodiment of the invention, a first pivot axle 278 extends between the second end 266 of the plates 262 of the pivot arm 254, and the first end 274 of the actuator 272 is coupled to the first pivot axle 278. Similarly, a second pivot axle 280 extends between the second end 260 of the plates 256 of the hinge base 252, and the second end 276 of the actuator 272 is coupled to the second pivot axle 280.

As a result, extension of the actuator 272 causes the first tube 164 and the second tube 202 to be aligned so that the nozzle 50 and rear boom section 17e are in the extended position 136. Conversely, contraction of the actuator 272 causes the second tube 202 to be pivoted about the pivot axis 270 so that the nozzle 50 and the rear boom section 17e are in the retracted position 138 to reduce the overall width of the applicator 10.

Figure 7:
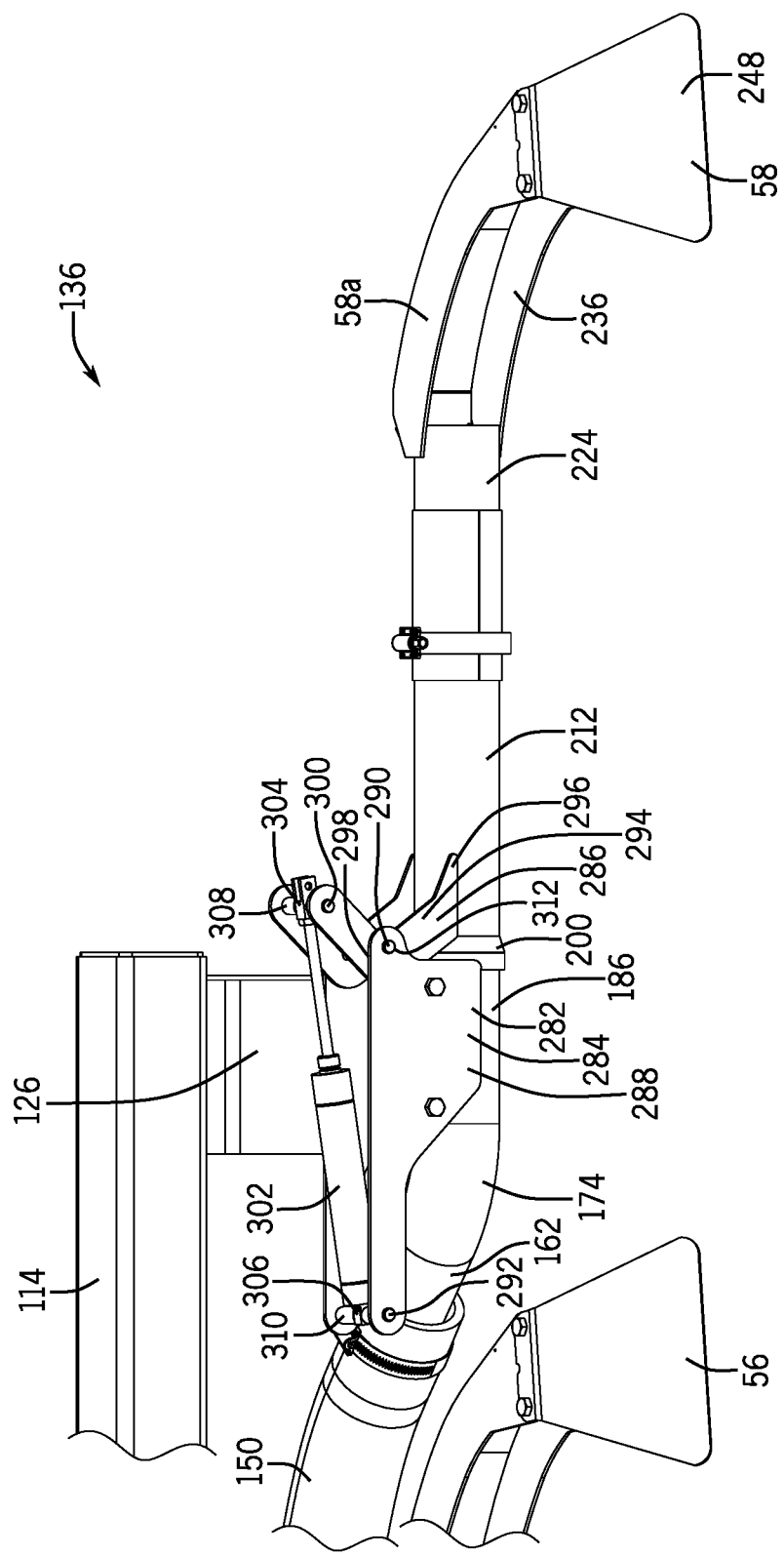
FIG. 7 illustrates an enlarged rear view of the right side of the rear boom of FIG. 4.

Referring now to FIG. 7, nozzle 58 and its respective straight tube 212 and elbow tube 174 is shown in greater detail. Similar to the above described hinge assembly 250, a hinge assembly 282 supports both the straight tube 212 and the elbow tube 174. In the representative embodiment of the invention, the hinge assembly 282 includes a hinge base 284 and a pivot arm 286. The hinge base 284 includes one or more plates 288 coupled to the first tube 174. The plates 288 extends from a first end 290 adjacent the second tube 212 to a second end 292 spaced away from the second tube 212 in a direction parallel to the second tube 212.

The pivot arm 286 includes one or more plates 294 having a first end 296, a pivot point 298, and a second end 300. Each plate 294 is coupled to the second tube 212 its first end 296 and extends upward toward the second end 300 with a pivot point 298 disposed between the first and second ends 296, 300. In the representative embodiment of the invention, each pivot arm plate 294 may be L-shaped. For example, each plate 294 may extend upward from the first end 296 at the second tube 212 and at an angle toward the first tube 174 to the pivot point 298. At the pivot point 298, the plate 294 extends upward form the pivot point 298 and at an angle away from the first tube 174 to its second end 300.

The first end 290 of the hinge base plates 288 is coupled to the pivot point 298 of the pivot arm plates 294 to create a pivot axis 312. Consequently, the hinge base 284 and the pivot arm 286 of the hinge assembly 282 are configured to pivot with respect to each other about the pivot axis 312. In turn, the first tube 174 and the second tube 212 are able to pivot with respect to each other about the pivot axis 312.

As shown in FIG. 7, the hinge assembly 282 further includes an actuator 302, such as a linear pneumatic cylinder, extending from a first end 304 aligned with the second end 300 of the pivot arm 286 to a second end 306 aligned with the second end 292 of the hinge base 284. For example, a first pivot axle 308 couples together the second end 300 of each of the pivot aim plates 294, and a second pivot axle 310 couples together the second end 292 of the hinge base plates 288. The first end 304 of the actuator 302 is coupled to the first pivot axle 308, while the second end 306 of the actuator 302 is coupled to the second pivot axle 310.

As such, extension of the actuator 302 causes the first tube 174 and the second tube 212 to be aligned so that the nozzle 58 and rear boom section 17e are in the extended position 136. Conversely, contraction of the actuator 302 causes the second tube 212 to be pivoted about the pivot axis 312 so that the nozzle 58 and the rear boom section 17e are in the retracted position 138 to reduce the overall width of the applicator 10.

As stated above, the inner ends 190, 200 of the second tubes 202, 212 are conically flared. It is contemplated that the conically flared inner ends 190, 200 of the second tubes 202, 212 allows for the outer ends 176, 186 of the first tubes 164, 174 to easily be inserted and removed from the inner ends 190, 200 of the second tubes 202, 212 as the rear boom section 17e is transitioned between the expanded position 136 and the retracted position 138. Further yet, the use of an actuator to transfer the rear boom section 17e between the expanded position 136 and the retracted position 138 allows a user to transition the rear boom section 17e from the operator cab 60 without having to get out of the operator cab 60 to remove locking pins and fold or remove parts to make the applicator 10 narrow enough to drive on the road.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A foldable rear boom section of an agricultural product applicator comprising:
   a support bar;
   a mounting bracket operably coupled with the support bar;
   at least one first tube connected to a first end of a respective at least one second tube;
   a hinge assembly coupled to the first and second tubes and configured to pivot the second tube with respect to the first tube about a pivot axis, the hinge assembly including a hinge base coupled to the first tube and the mounting bracket, the hinge base including one or more hinge base plates extending from a first end adjacent the second tube to a second end spaced apart from the second tube, the hinge assembly further including a pivot arm coupled to the second tube, the pivot arm including one or more pivot arm plates coupled to the second tube at a first end of the one or more pivot arm plates, wherein each pivot arm plate of the one or more pivot arm plates extends upward from the first end of the pivot arm plate to a pivot point and then upward from the pivot point to a second end of the pivot arm plate;
   a nozzle connected to a second end of the second tube;
   wherein pivoting the first and second tubes about the pivot axis causes the foldable rear boom section and the nozzle to transition between an extended position and a retracted position,
   wherein the first end of each of the one or more hinge base plates and the pivot point of each of the one or more pivot arm plates are pivotably coupled together and configured to allow the first and second tubes to pivot with respect to each other, and
   wherein the hinge assembly further includes an actuator configured to cause pivoting of the pivot arm with respect to the hinge base in order to cause pivoting of the second tube with respect to the first tube, the actuator being coupled at one end to the second end of each of the one or more pivot arm plates.

2. The foldable rear boom section of claim 1 wherein the first end of the second tube is conically flared and configured to receive the first tube.

3. The foldable rear boom section of claim 1 wherein a first pivot axle is provided at the second end of the one or more pivot arm plates and a second pivot axle is provided at the second end of the one or more hinge base plates; and
   wherein the one end of the actuator is coupled to the first pivot axle and an opposed end of the actuator is coupled to the second pivot axle.

4. A rear boom section of an agricultural product applicator comprising:
   a support bar;
   a mounting bracket operably coupled with the support bar;
   a plurality of supply lines;

a plurality of first tubes, each first tube having a first end and second end, the first end of each first tube being coupled to a respective one of the plurality of supply lines for receiving an agricultural product therethrough;

a plurality of second tubes, each second tube having a first end and a second end, the first end of each second tube being coupled to the second end of a respective one of the plurality of first tubes to allow the agricultural product to be directed therethrough;

a plurality of nozzles, each nozzle is configured to distribute the agricultural product received from a respective one of the plurality of supply lines by way of a respective one of the plurality of first tubes and a respective one of the plurality of second tubes;

at least one hinge assembly coupled to a respective first and second tubes and configured to transition the respective nozzle between an extended position to a retracted position, the at least one hinge assembly including a hinge base coupled to one of the plurality of first tubes and a pivot arm coupled to one of the plurality of tubes, the pivot arm at least partially outboard of the support bar;

wherein, when in the extended position, a continuous flow path is defined to each nozzle by the respective ones of the pluralities of first and second tubes along which the agricultural product is directed through the respective one of the plurality of first tubes to the respective one of the plurality of second tubes for delivery to the nozzle, and, when in the retracted position, the continuous flow path is interrupted at a location at which the respective one of the plurality of second tubes has been pivoted away from the respective one of the plurality of first tubes.

5. The rear boom section of claim 4 wherein the second end of at least one of the plurality of first tubes is tapered to fit within the first end of a respective second tube of the plurality of second tubes; and wherein the first end of at least one of the plurality of second tubes is conically flared to receive the second end of a respective first tube of the plurality of first tubes.

6. The rear boom section of claim 4 wherein each hinge assembly includes a hinge base coupled to a respective first tube of the plurality of first tubes and a pivot arm coupled to a respective second tube of the plurality of second tubes.

7. The rear boom section of claim 6 wherein the hinge base includes one or more hinge base plates linearly extending parallel to the respective second tube and from a first end adjacent the respective second tube to a second end spaced apart from the respective second tube; and wherein the pivot arm includes one or more pivot arm plates coupled to the respective second tube at a first end of the one or more pivot arm plates, wherein each pivot arm plate of the one or more pivot arm plates extends upward from the first end of the pivot arm plate to a pivot point and then upward from the pivot point to a second end of the pivot arm plate.

8. The rear boom section of claim 7 wherein the first end of each hinge base plate of the one or more hinge base plates and the pivot point of each pivot arm plate of the one or more pivot arm plates are pivotably coupled together at a pivot axis configured to allow the respective second tube to pivot with respect to the respective first tube about the pivot axis.

9. The rear boom section of claim 8 wherein the hinge assembly further includes an actuator having a first end aligned with the second end of each pivot arm plate of the one or more pivot arm plates and a second end aligned with the second end of each hinge base plate of the one or more hinge base plates, the actuator configured to cause pivoting of the respective second tube with respect to the respective first tube about the pivot axis.

10. The rear boom section of claim 7 wherein each pivot arm plate of the one or more pivot arm plates extends upward from the first end of the pivot arm plate to the pivot point at an angle toward the respective first tube; and wherein each pivot arm plate of the one or more pivot arm plates extends upward from the pivot point to the second end of the pivot arm plate at an angle away from the respective first tube.

11. The rear boom section of claim 4 wherein the at least one hinge assembly includes: first hinge assembly coupled to a respective first and second tubes and configured to transition the respective nozzle from an extended position to a retracted position; and a second hinge assembly coupled to respective first and second tubes and configured to transition the respective nozzle from an extended position to a retracted position.

12. An agricultural product applicator comprising:

a conveying system including a supply line for supplying an agricultural product;

a rear boom section having:
a plurality of secondary supply lines coupled to the supply line of the conveying system for receiving the agricultural product from the conveying system;
a first outer distribution system including:
a first tube having a first end coupled to a first respective one of the plurality of secondary supply lines;
a second tube having a first end coupled to a second end of the first tube; and
a nozzle connected to the second tube of the first outer distribution system;
a first hinge assembly configured to transition the first outer distribution system between an extended position and a retracted position, wherein, when in the extended position, a continuous flow path is defined by the first and second tubes of the first outer distribution system along which the agricultural product is directed through the first tube of the first outer distribution system to the second tube of the first outer distribution system for delivery to the nozzle, and, when in the retracted position, the continuous flow path is interrupted at a location at which the second tube of the first outer distribution system has been pivoted away from the second tube of the first outer distribution system;
a second outer distribution system including:
a first tube having a first end coupled to a second respective one of the plurality of secondary supply lines; and
a second tube having a first end coupled to a second end of the first tube; and
a nozzle connected to the second tube of the second outer distribution system; and
a second hinge assembly configured to transition the second outer distribution system between an extended position and a retracted position, wherein, when in the extended position, a continuous flow path is defined by the first and second tubes of the second outer distribution system along which the agricultural product is directed through the first tube of the second outer distribution system to the second tube of the second outer distribution system for delivery to the nozzle, and, when in the retracted position, the continuous flow path is interrupted at a location at which the second tube of the second outer distribution system has been pivoted away from the first tube of the second outer distribution system; and a forward boom section separated from the rear boom section, the forward boom section including a pair of opposing in-board most nozzles, wherein the nozzle connected to the second tube of the first outer distribution system and nozzle connected to the second tube of the second outer distribution system are each positioned between the pair of opposing in-board most nozzles in the extended position and the retracted position.

13. The agricultural product applicator of claim 12 wherein the first hinge assembly includes a hinge base coupled to the first tube of the first outer distribution system and a pivot arm coupled to the second tube of the first outer distribution system; and wherein the second hinge assembly includes a hinge base coupled to the first tube of the second outer distribution system and a pivot arm coupled to the second tube of the second outer distribution system.

14. The agricultural product applicator of claim 13 wherein the hinge base of each hinge assembly extends parallel to the respective second tube associated with the hinge base from a first end adjacent the respective second tube to a second end spaced apart from the respective second tube; and wherein the pivot arm of each hinge assembly is coupled to the respective second tube associated with the pivot arm at a first end of the pivot arm, the pivot arm extending upward from the first end to a pivot point and then upward from the pivot point to a second end.

15. The agricultural product applicator of claim 14 wherein each hinge assembly further includes an actuator having a first end aligned with the second end of the pivot arm and a second end aligned with the second end of the hinge base; and wherein the actuator is configured to cause pivoting of the respective second tube with respect to the respective first tube about the pivot axis.

16. The agricultural product applicator of claim 12 wherein the first ends of the second tubes of the first and second outer distribution systems are conically flared to receive the second ends of their respective first tube.

\* \* \* \* \*